(12) United States Patent
Hayamizu et al.

(10) Patent No.: US 12,449,613 B2
(45) Date of Patent: Oct. 21, 2025

(54) OPTICAL PART AND SEMICONDUCTOR LASER MODULE

(71) Applicant: FURUKAWA ELECTRIC CO., LTD., Tokyo (JP)

(72) Inventors: Naoki Hayamizu, Tokyo (JP); Hiroshi Hashimoto, Tokyo (JP); Hideyuki Nasu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 294 days.

(21) Appl. No.: 17/445,216

(22) Filed: Aug. 17, 2021

(65) Prior Publication Data

US 2021/0373256 A1    Dec. 2, 2021

Related U.S. Application Data

(63) Continuation of application No. PCT/JP2020/010460, filed on Mar. 11, 2020.

(30) Foreign Application Priority Data

Mar. 12, 2019    (JP) .................. 2019-045001

(51) Int. Cl.
*G02B 6/42* (2006.01)
*H01S 5/02218* (2021.01)
(Continued)

(52) U.S. Cl.
CPC ......... *G02B 6/4203* (2013.01); *G02B 6/4296* (2013.01); *H01S 5/02218* (2021.01); *H01S 5/02251* (2021.01); *H01S 5/02253* (2021.01)

(58) Field of Classification Search
CPC ...... G02B 6/266; G02B 6/421; G02B 6/4203; G02B 6/4296; H01S 5/02216; H01S 5/02251
See application file for complete search history.

(56) References Cited

U.S. PATENT DOCUMENTS 8,229,260 B2 *   7/2012   Frith .................... G02B 6/4206
                                                            385/127
2005/0196108 A1   9/2005   Brown
(Continued)

FOREIGN PATENT DOCUMENTS

CN    104981952 A    10/2015
CN    105518505 A    4/2016
(Continued)

OTHER PUBLICATIONS

International Search Report issued Jun. 16, 2020 in PCT/JP2020/010460 filed on Mar. 11, 2020, 2 pages.
(Continued)

*Primary Examiner* — Thomas A Hollweg
(74) *Attorney, Agent, or Firm* — Oblon, McClelland, Maier & Neustadt, L.L.P.

(57) ABSTRACT

An optical part includes: an optical fiber having a core portion and a cladding portion that is formed around the core portion; a light absorber placed around the optical fiber; and an adhesive member that adheres the light absorber and the optical fiber to each other. Further, the cladding portion includes: a main portion extending along a longitudinal direction and having a main portion cladding diameter; and an input end portion positioned closer to a light input side with respect to the main portion, and an input end face cladding diameter at an input end face of the input end portion is less than the main portion cladding diameter.

15 Claims, 8 Drawing Sheets

(51) Int. Cl.
  *H01S 5/02251*   (2021.01)
  *H01S 5/02253*   (2021.01)

(56) References Cited

U.S. PATENT DOCUMENTS

| | | |
|---|---|---|
| 2012/0262938 A1 | 10/2012 | Price et al. |
| 2016/0246022 A1 | 8/2016 | Ishige et al. |
| 2017/0315311 A1 | 11/2017 | Ishige et al. |
| 2019/0020178 A1 | 1/2019 | Oguri et al. |

FOREIGN PATENT DOCUMENTS

| | | |
|---|---|---|
| CN | 107251343 A | 10/2017 |
| CN | 109073833 A | 12/2018 |
| JP | 01-316705 A | 12/1989 |
| JP | 2017-223897 A | 12/2017 |
| JP | 2019-028414 A | 2/2019 |
| WO | WO 2015/037725 A1 | 3/2015 |
| WO | WO 2017/134911 A1 | 8/2017 |

OTHER PUBLICATIONS

Combined Chinese Office Action and Search Report issued Jul. 19, 2023, in corresponding Chinese Patent Application No. 202080016444.8 (with English Translation and English Translation of Category of Cited Documents), 13 pages.

Japanese Office Action issued Oct. 10, 2023 in Japanese Application 2021-505099 (with unedited computer-generated English translation), 5 pages.

* cited by examiner

OPTICAL PART AND SEMICONDUCTOR LASER MODULE

CROSS-REFERENCE TO RELATED APPLICATION(S)

This application is a continuation of International Application No. PCT/JP2020/010460, filed on Mar. 11, 2020 which claims the benefit of priority of the prior Japanese Patent Application No. 2019-045001, filed on Mar. 12, 2019, the entire contents of which are incorporated herein by reference.

BACKGROUND

The present disclosure relates to an optical part and a semiconductor laser module.

Semiconductor laser modules are used in the industrial field, such as processing and welding. A semiconductor laser module having a configuration including: a glass capillary provided around an optical fiber to fix the optical fiber; and a light absorber provided around the glass capillary to fix the glass capillary has been disclosed, the configuration being that of a part that couples a laser light beam output from a semiconductor laser element into the optical fiber. The optical fiber and the glass capillary are adhered to each other by a first adhesive member, such as resin, for example. The glass capillary and the light absorber are adhered to each other by a second adhesive member, such as resin, for example (International Publication No. WO 2015/037725). In this configuration, a part of the laser light beam input to the optical fiber is propagated in a cladding mode without being coupled into the core portion. Such a laser light beam gradually leaks from the cladding portion during propagation, reaches the light absorber by being transmitted through the two adhesive members and the glass capillary, and is absorbed by the light absorber. The coating of the optical fiber has been removed at the part that couples the laser light beam into the optical fiber and the cladding portion is thus exposed at the part. The configuration in International Publication No. WO 2015/037725 enables reduction of damage to the coating.

SUMMARY

There is a need for providing an optical part and a semiconductor laser module that are to be less damaged.

According to an embodiment, an optical part includes: an optical fiber having a core portion and a cladding portion that is formed around the core portion; a light absorber placed around the optical fiber; and an adhesive member that adheres the light absorber and the optical fiber to each other. Further, the cladding portion includes: a main portion extending along a longitudinal direction and having a main portion cladding diameter; and an input end portion positioned closer to a light input side with respect to the main portion, and an input end face cladding diameter at an input end face of the input end portion is less than the main portion cladding diameter.

DETAILED DESCRIPTION

In the industrial field, there is a demand for increase in the power of a laser light beam from light sources. With the configuration in International Publication No. WO 2015/037725, as the power of laser light beam is increased, the power of the partial laser light beam propagated in a cladding mode is increased, the partial laser light beam being a part of the laser light beam. As a result, the laser light beam that has been propagated in the cladding mode and has leaked from the cladding portion may damage the first or second adhesive member. In particular, because the first adhesive member is adjacent to the periphery of the cladding portion, the laser light beam that has leaked to the first adhesive member is high in power density and the first adhesive member is more easily damaged than the second adhesive member.

Embodiments of the present disclosure will be described in detail below while reference is made to the appended drawings. The present disclosure is not limited by the embodiments described below. Any elements that are the same or corresponding to each other will be assigned with the same reference sign throughout the drawings and redundant description thereof will be omitted as appropriate. It also needs to be noted that the drawings are schematic, and relations among dimensions of elements and ratios among the elements, for example, may be different from the actual ones.

First Embodiment

Figure 1:
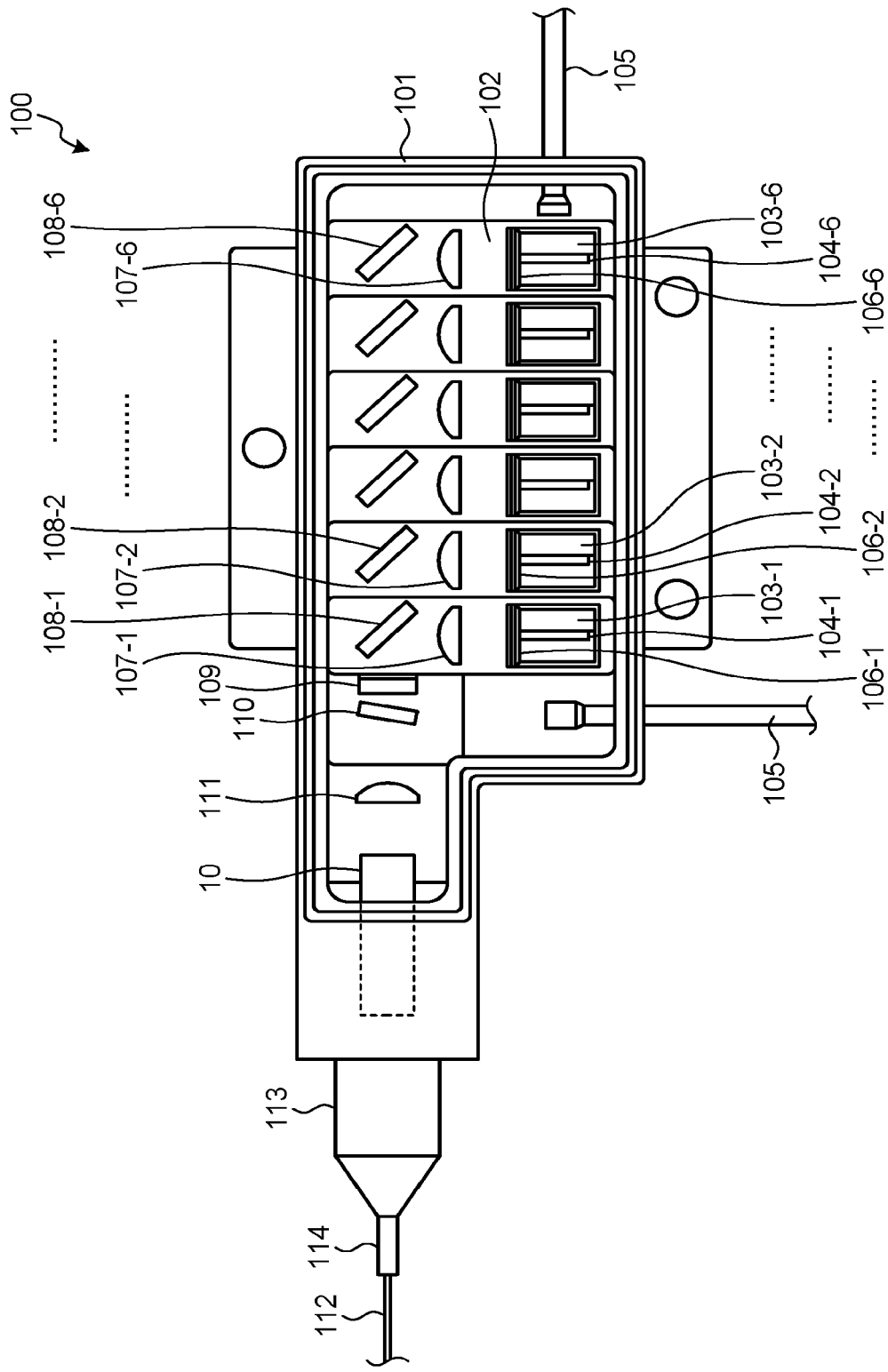
FIG. 1 is a schematic plan view of a semiconductor laser module including an optical part according to a first embodiment.

FIG. 1 is a schematic plan view of a semiconductor laser module including an optical part according to a first embodiment. A semiconductor laser module 100 includes a package 101 that is a housing, LD height adjusting plates 102 mounted in sequence inside the package 101, submounts 103-1 to 103-6, and six semiconductor laser elements 104-1 to 104-6. The package 101 includes a lid, but for explanation, the lid is not illustrated in FIG. 1. The semiconductor laser module 100 includes a lead pin 105 through which electric current is injected into the semiconductor laser elements 104-1 to 104-6. The semiconductor laser module 100 includes first lenses 106-1 to 106-6, second lenses 107-1 to 107-6, mirrors 108-1 to 108-6, a third lens 109, an optical filter 110, and a fourth lens 111 that are optical elements placed in sequence on optical paths of laser light beams output by the semiconductor laser elements 104-1 to 104-6. The first lenses 106-1 to 106-6, the second lenses 107-1 to 107-6, the mirrors 108-1 to 108-6, the third lens 109, the optical filter 110, and the fourth lens 111 have each been fixed inside the package 101. The semiconductor laser module 100 also includes an optical part 10 placed opposite to the fourth lens, and an optical fiber 112 connected to the optical part 10 by fusion splicing, for example. One end of the optical fiber 112 extends outside the package 101, the one end being opposite to an end of the optical fiber 112, the end being connected to the optical part 10.

The semiconductor laser elements 104-1 to 104-6 have been placed at heights different from each other from a bottom surface of the package 101, by means of the LD height adjusting plates 102. Furthermore, the first lenses 106-1 to 106-6, the second lenses 107-1 to 107-6, and the mirrors 108-1 to 108-6 have been respectively placed at the same heights as the corresponding ones of the semiconductor laser elements. In addition, a loose tube 114 is provided at a portion of the optical fiber 112, the portion being where the optical fiber 112 is inserted in the package 101, and a boot 113 is externally fitted to a portion of the package 101 so as to cover a portion of the loose tube 114.

Each of the semiconductor laser elements 104-1 to 104-6 outputs a laser light beam by being supplied with electric power from the lead pin 105. The laser light beams output are formed into approximately collimated light respectively by the first lenses 106-1 to 106-6 and the second lenses 107-1 to 107-6. Each laser light beam is next reflected by one of the mirrors 108-1 to 108-6 in the direction of the optical fiber 112, the one being positioned at a height corresponding to that laser light beam. The laser light beam is then condensed by the third lens 109 and the fourth lens 111. Accordingly, the first lenses 106-1 to 106-6, the second lenses 107-1 to 107-6, the mirrors 108-1 to 108-6, the third lens 109, and the fourth lens 111 form an optical system that guides the laser light beam to the optical part.

The optical part 10 couples the laser light beams condensed by the fourth lens 111, into the optical fiber 112. The optical fiber 112 outputs the coupled laser light beam to the exterior of the semiconductor laser module 100.

Components of the semiconductor laser module 100 will be described in more detail next. The package 101 that is a housing is preferably made of a material high in thermal conductivity to prevent the temperature inside the package 101 from increasing, and the package 101 may thus be a metallic member made of any of various metals.

As described above, the LD height adjusting plates 102 have been fixed in the package 101 and adjust the height of the semiconductor laser elements 104-1 to 104-6, to prevent optical paths of laser light beams output by the semiconductor laser elements 104-1 to 104-6 from interfering with each other. The LD height adjusting plates 102 may be integrally formed with the package 101.

The submounts 103-1 to 103-6 have been fixed onto the LD height adjusting plates 102 and assist heat radiation from the semiconductor laser elements 104-1 to 104-6 mounted thereon. Therefore, the submounts 103-1 to 103-6 are preferably made of a material that is high in thermal conductivity and may be metallic members made of any of various metals.

The semiconductor laser elements 104-1 to 104-6 are high-power semiconductor laser elements that output the respective laser light beams each having optical power of 1 W or more, or 10 W or more. In this embodiment, the optical power of the laser light beam output by the semiconductor laser elements 104-1 to 104-6 is, for example, 11 W. Furthermore, the semiconductor laser elements 104-1 to 104-6 output laser light beams each having a wavelength of, for example, 900 nm to 1000 nm. The semiconductor laser module 100 includes the six semiconductor laser elements 104-1 to 104-6 but the number of semiconductor laser elements may be plural or singular, without being limited to six.

The lead pin 105 supplies electric power to the semiconductor laser elements 104-1 to 104-6 via bonding wires not illustrated in the drawings. The voltage of electric power supplied may be constant, but may be modulation voltage instead.

The first lenses 106-1 to 106-6 are, for example, cylindrical lenses having a focal length of 0.3 mm. The first lenses 106-1 to 106-6 are each placed at a position where output light from a corresponding one of the semiconductor laser elements is formed into approximately collimated light.

The second lenses 107-1 to 107-6 are, for example, cylindrical lenses having a focal length of 5 mm. The second lenses 107-1 to 107-6 are placed at positions where the output light from the semiconductor laser elements is formed into approximately collimated light.

The mirrors 108-1 to 108-6 may be mirrors including any of various types of metallic films or dielectric films, and the higher the reflectance of the mirrors 108-1 to 108-6 is at the wavelength of the laser light beams output by the semiconductor laser elements 104-1 to 104-6, the more preferable the mirrors 108-1 to 108-6 are. Furthermore, the reflection direction of each of the mirrors 108-1 to 108-6 is able to be finely adjusted such that the laser light beams from a corresponding one of the semiconductor laser elements is suitably coupled into the optical fiber 112.

The third lens 109 and the fourth lens 111 are cylindrical lenses respectively having focal lengths of 12 mm and 5 mm and having curvatures orthogonal to each other, condense the laser light beams output by the semiconductor laser elements 104-1 to 104-6, and suitably couple the condensed laser light beam into the optical fiber 112. Positions of the third lens 109 and the fourth lens 111 in relation to the optical fiber 112 have been adjusted such that, for example, the coupling efficiency of the laser light beams output by the semiconductor laser elements 104-1 to 104-6 into the optical fiber 112 becomes 85% or higher.

The optical filter 110 is, for example, a low-pass filter that reflects light having a wavelength of 1060 nm to 1080 nm and transmits light of 900 nm to 1000 nm. As a result, the optical filter 110 transmits laser light beam output by the semiconductor laser elements 104-1 to 104-6 and prevents light having a wavelength of 1060 nm to 1080 nm from being emitted from the outside to the semiconductor laser elements 104-1 to 104-6. Furthermore, the optical filter 110 has been arranged at an angle to the optical axis of the laser light beam such that the output laser light beam from the semiconductor laser elements 104-1 to 104-6 that is slightly reflected by the optical filter 110 does not return to the semiconductor laser elements 104-1 to 104-6. The wavelength passing the optical filter 110 has been described above as being 1060 nm to 1080 nm, but is not limited to this wavelength. However, the optical filter 110 is not necessarily required.

The boot 113 has the optical fiber 112 inserted therethrough and prevents the optical fiber 112 from being damaged due to bending. The boot 113 may be a boot made of metal, but without being particularly limited, the material may be rubber, any of various resins, or plastic, for example. However, the boot 113 is not necessarily required.

The loose tube 114 has the optical fiber 112 inserted therethrough and prevents the optical fiber 112 from being damaged due to bending. Furthermore, the loose tube 114 may be configured to be adhered to the optical fiber 112 and as a result, prevent the optical fiber 112 from being displaced when a force pulling the optical fiber 112 along a longitudinal direction thereof is applied to the optical fiber 112. However, the loose tube 114 is not necessarily required.

Configuration of Optical Part

Figure 2:
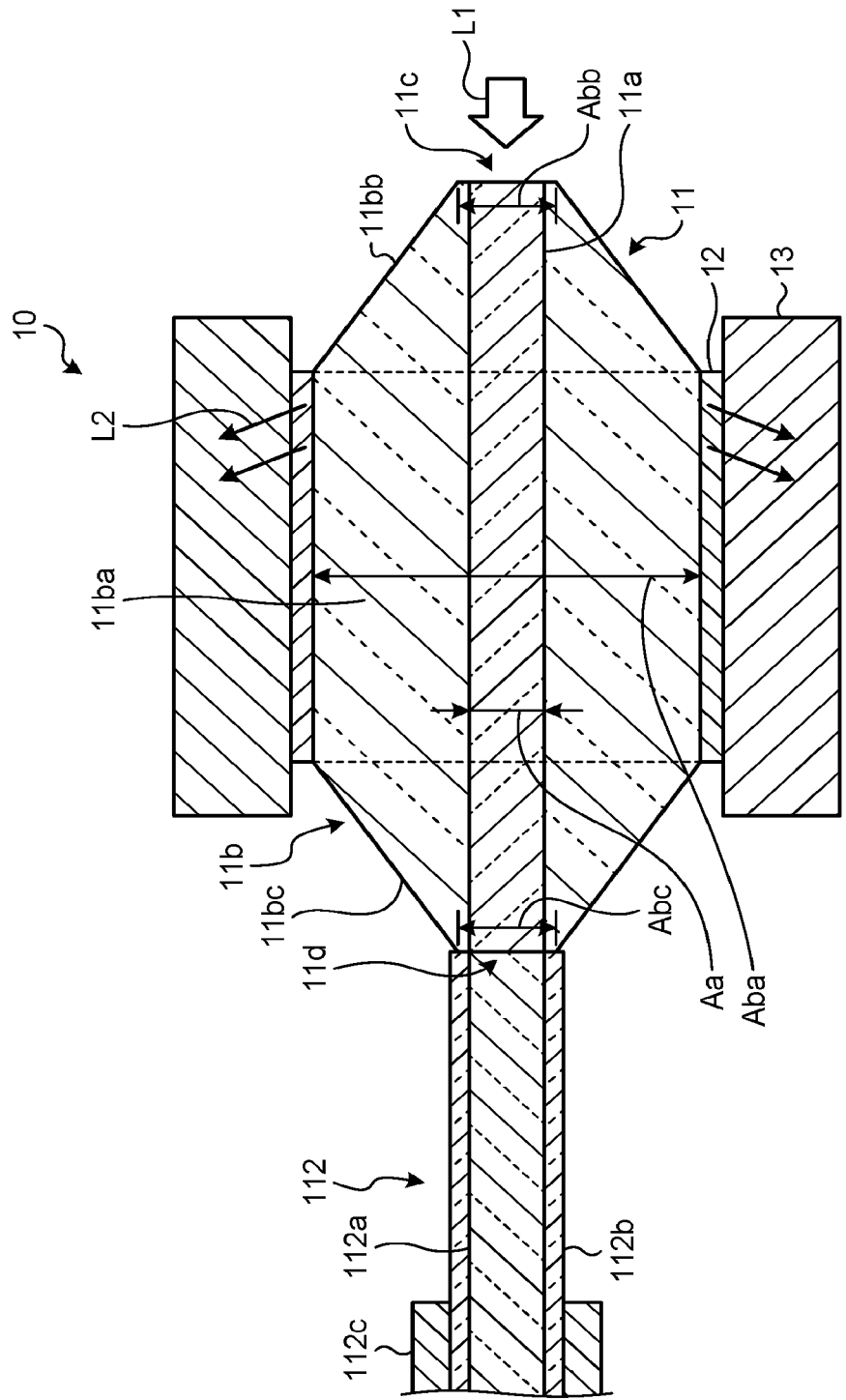
FIG. 2 is a schematic sectional view of the optical part and an optical fiber, according to the first embodiment.

A configuration of the optical part 10 will be described specifically next. FIG. 2 is a schematic sectional view of the optical part 10 and the optical fiber 112.

The optical part 10 includes an optical fiber 11, an adhesive member 12, and a light absorber 13. The optical fiber 11 is an optical fiber made of a silica glass-based material, and has a core portion 11a and a cladding portion 11b formed around the core portion 11a.

The core portion 11a has a core diameter Aa that is approximately constant in the longitudinal direction. The core diameter Aa is, for example, 100 μm.

The cladding portion 11b has a main portion 11ba extending in the longitudinal direction, an input end portion 11bb positioned closer to an end of the cladding portion 11b than the main portion 11ba is, the end being where a laser light beam L1 that is the laser light beam condensed by the fourth lens 111 is input, and an output end portion 11bc positioned closer to another end of the cladding portion 11b than the main portion 11ba is, the other end being where the laser light beam L1 is output. The cladding portion 11b has a refractive index lower than a refractive index of the core portion 11a.

The main portion 11ba has a main portion cladding diameter Aba that is approximately constant in the longitudinal direction. The input end portion 11bb has an input end face 11c. A cladding diameter at the input end face 11c will be referred to as an input end face cladding diameter Abb. The input end face cladding diameter Abb is smaller than the main portion cladding diameter Aba. Furthermore, the input end portion 11bb has a tapered shape in which its cladding diameter continuously changes from the main portion cladding diameter Aba to the input end face cladding diameter Abb. However, the input end portion 11bb may have a tapered shape in which the cladding diameter continuously changes from the main portion cladding diameter Aba to a diameter substantially equal to the input end face cladding diameter Abb.

The output end portion 11bc has an output end face 11d. An output end face cladding diameter Abc that is a cladding diameter at the output end face 11d is smaller than the main portion cladding diameter Aba. Furthermore, the output end portion 11bc has a tapered shape in which its cladding diameter continuously changes from the main portion cladding diameter Aba to the output end face cladding diameter Abc.

The light absorber 13 is a tubular member, is provided around the optical fiber 11, and is adhered to the main portion 11ba of the cladding portion 11b by the adhesive member 12. The light absorber 13 absorbs light at the wavelength of the laser light beam L1, and has an absorptivity of, for example, 30% or more and preferably 70% or more, at this wavelength. As a result, the light absorber 13 absorbs a laser light beam L2 that has leaked from the cladding portion 11b. Furthermore, the light absorber 13 is preferably made of a material that is high in thermal conductivity to radiate heat generated by light absorption, and is thus preferably made of, for example: a metallic member including Cu, Ni, stainless steel, or Fe; a member including a surface plating layer including metal or C, the metal containing Ni, Cr, or Ti; a ceramic member including AlN or Al$_2$O$_3$; or a member including a ceramic layer covering its surface, the ceramic layer including AlN or Al$_2$O$_3$. In addition, the light absorber 13 is preferably connected to the package 101 via a good heat conductor not illustrated in the drawings, to radiate the heat generated by the light absorption. The good heat conductor is preferably made of a material having thermal conductivity of 0.5 W/mK or higher, and is thus made of, for example, solder or a thermally conductive adhesive.

The adhesive member 12 is made of, for example, UV-curable resin, such as epoxy resin or urethane resin. The adhesive member 12 has a refractive index equal to or higher than the refractive index of the cladding portion 11b of the optical fiber 11 at 25° C., and more preferably equal to or higher than the refractive index of the cladding portion 11b of the optical fiber 11 in the operating temperature range (for example, 15° C. to 100° C.) of the semiconductor laser module 100. The adhesive member 12 has a relative refractive index difference of, for example, 0% or more and 10% or less with respect to the cladding portion 11b. Furthermore, the adhesive member 12 preferably has a thickness of 1 μm or more and 800 μm or less along a direction orthogonal to the longitudinal direction of the optical fiber 11. The UV-curable resin is known to be able to be decreased in refractive index by containing fluorine and increased in refractive index by containing sulfur, for example, and thus its refractive index is able to be adjusted by adjustment of the content of the material that increases the refractive index or the material that decreases the refractive index.

The optical fiber 112 is an optical fiber made of a silica glass-based material and is connected to the output end face 11d by fusion splicing, for example. The optical fiber 112 includes a core portion 112a, a cladding portion 112b formed around the core portion 112a, and a coating 112c formed around the cladding portion 112b. A part of the coating 112c has been removed and the cladding portion 112b is exposed at that part, the part being near the output end face 11d. The optical fiber 112 may be a multi-mode optical fiber in which the core portion 112a has a core diameter of 105 μm and the cladding portion 112b has a cladding diameter of 125 μm, for example, but may be a single-mode optical fiber instead. The optical fiber 112 has an NA of, for example, 0.15 to 0.22.

In this optical part 10, because the input end face cladding diameter Abb is smaller than the main portion cladding diameter Aba, the power of the laser light beam propagated in a cladding mode without being coupled into the core portion 11a is able to be reduced, the laser light beam being a part of the laser light beam L1 input to the optical fiber 11.

Figure 3:
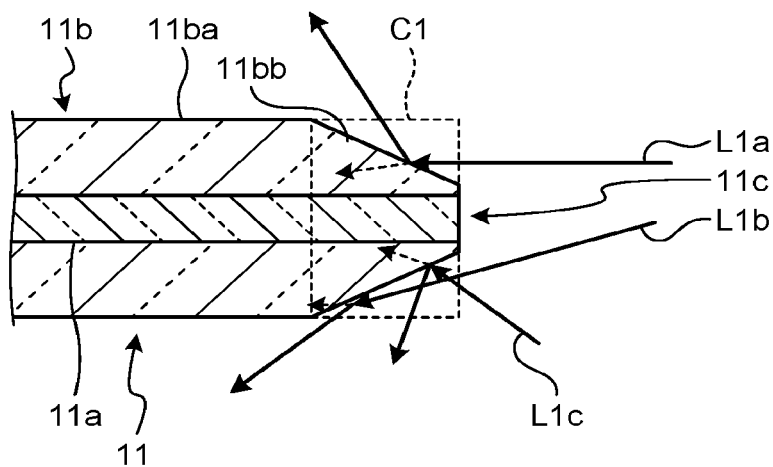
FIG. 3 is a diagram illustrating a state of input of laser light beams to an optical fiber.

FIG. 3 is a diagram illustrating a state of input of laser light beams L1a, L1b, and L1c to the optical fiber 11. The laser light beams L1a, L1b, and L1c are a part of the laser light beam L1. Furthermore, a contour C1 represented by a broken line represents a case where the cladding diameter at the input end face 11c is the same as the cladding diameter at the main portion 11ba. In the case of the state with the contour C1, the laser light beams L1a, L1b, and L1c are all input to the cladding portion 11b and propagated in a cladding mode. However, because the cladding diameter at the input end face 11c of the optical fiber 11 is small, the laser light beams L1a, L1b, and L1c are hardly coupled into the cladding or are not coupled to the cladding at all, or the laser light beams L1a, L1b, and L1c are easily reflected by the tapered surface or easily leak out even if the laser light beams L1a, L1b, and L1c are coupled into the cladding. As a result, the power of the laser light beam propagated in a cladding mode is able to be reduced and the power of the laser light beam L2 leaking from the cladding portion 11b is also able to be reduced. Damage to the adhesive member 12 is thereby able to be reduced. The angle of the tapered surface of the input end portion 11*bb* is preferably an angle at which the amount of the laser light beam propagated in a cladding mode is decreased.

Figure 4:
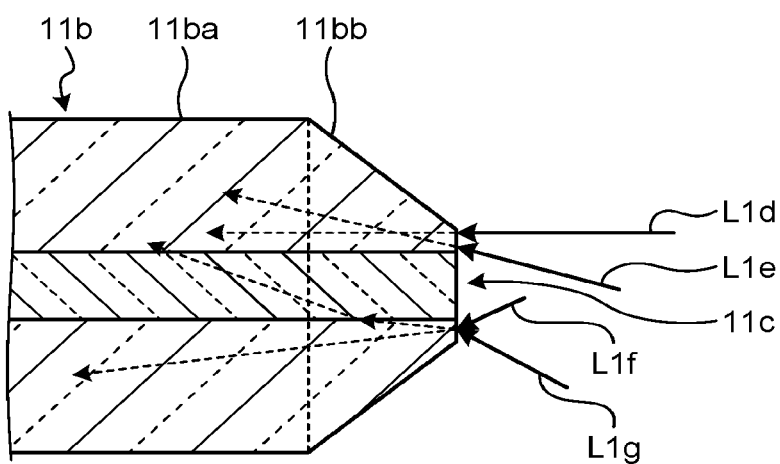
FIG. 4 is a diagram illustrating a state of input of laser light beams to the optical fiber.

FIG. 4 is a diagram illustrating a state of input of laser light beams L1*d*, L1*e*, L1*f*, and L1*g* to the optical fiber 11. The laser light beams L1*d*, L1*e*, L1*f*, and L1*g* are a part of the laser light beam L1. The laser light beams L1*d*, L1*e*, L1*f*, and L1*g* are input to the cladding portion 11*b* from a small end surface of the input end portion 11*bb* and propagated in a cladding mode, but because the area is small, the power is limited, the small end surface forming the input end face 11*c*.

Reference will now be made to FIG. 2 again. The input end face cladding diameter Abb is preferably 1.4 times the core diameter Aa of the core portion 11*a* or smaller. When the input end face cladding diameter Abb is 1.4 times the core diameter Aa or smaller, the effect of reducing the power of the laser light beam propagated in a cladding mode is adequately achieved. However, when the input end face cladding diameter Abb is too small, the laser light beam propagated through the core portion 11*a* may reach the outer periphery of the cladding portion 11*b* by seeping out to the cladding portion 11*b*. To prevent this seeping, the input end face cladding diameter Abb is preferably 1.1 times the core diameter Aa of the core portion 11*a* or larger.

Furthermore, the main portion cladding diameter Aba of the main portion 11*ba* of the cladding portion 11*b* of the optical fiber 11 in this optical part 10 is larger than 125 µm, which is the cladding diameter of a standard optical fiber, and is 500 µm in this embodiment. As a result, the power density of the laser light beam L2 would be reduced by the time the laser light beam L2 propagated in a cladding mode reaches the outer peripheral surface of the main portion 11*ba* and passes through the adhesive member 12. Accordingly, damage to the adhesive member 12 is able to be reduced even more.

When, for example, the power of the laser light beam propagated in a cladding mode (the cladding propagating light quantity) is 5 W and the cladding diameter is 125 µm, the ratio of the cladding propagating light quantity to the cladding diameter is 0.04 W/µm. For example, if damage to the adhesive member is reduced when the ratio is 0.04 W/µm, the larger the cladding diameter is, the larger the cladding propagating light quantity satisfying 0.04 W/µm becomes.

Figure 5:
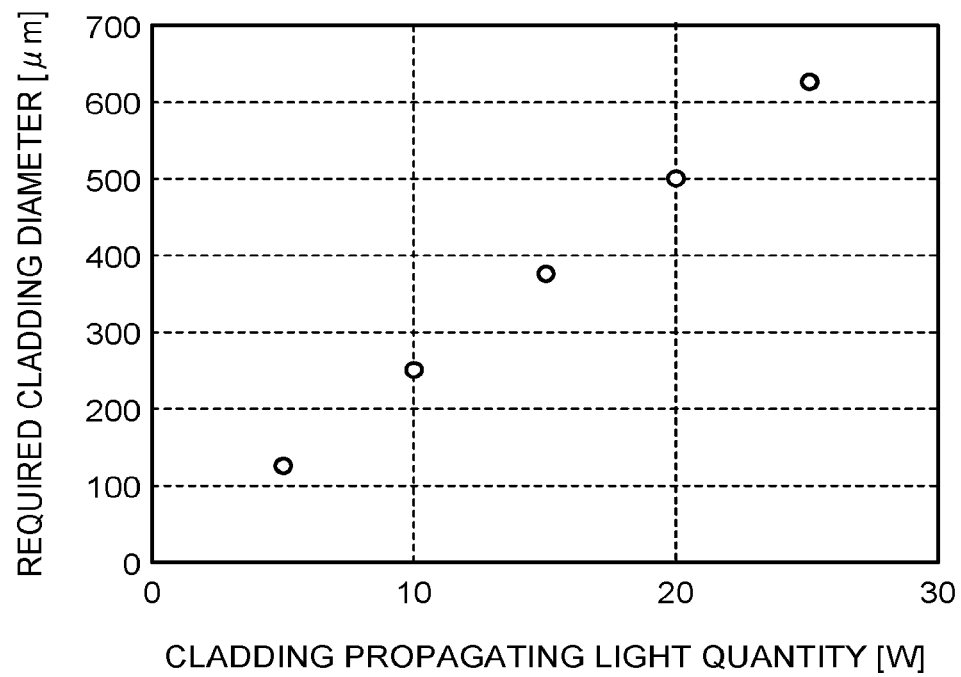
FIG. 5 is a diagram illustrating required cladding diameter in relation to cladding propagating light quantity.

The cladding diameter required for a certain cladding propagating light quantity to satisfy 0.04 W/µm will be referred to as the required cladding diameter. FIG. 5 is a diagram illustrating the required cladding diameter in relation to the cladding propagating light quantity. As illustrated therein, when the cladding diameter is 250 µm, even if the cladding propagating light quantity is 10 W, the damage to the adhesive member is able to be reduced. If the cladding diameter is 500 µm or larger, even if the cladding propagating light quantity is 20 W or more, the damage to the adhesive member is able to be reduced. When the cladding propagating light quantity is able to be increased as described above, the power of the laser light beam L1 input to the optical part 10 is also able to be increased and this is thus suitable for increasing the power of the semiconductor laser module 100.

Furthermore, because the output end face cladding diameter Abc at the output end face 11*d* of the output end portion 11*bc* in this optical part 10 is smaller than 500 µm that is the main portion cladding diameter Aba; in a case where the optical fiber 112 is a multi-mode optical fiber having a cladding diameter of 125 µm, the difference between the cladding diameters of the output end portion 11*bc* and the cladding portion 112*b* at the joint is small. As a result, alignment and connection between the optical fiber 11 and the optical fiber 112 are facilitated. What is more, because the output end portion 11*bc* is tapered, the laser light beam that has reached the output end portion 11*bc* without leaking at the main portion 11*ba* is able to be caused to leak out, the laser light beam being a part of the laser light beam propagated in a cladding mode.

Furthermore, because the optical fiber 112 having a configuration that is commonly used has been connected to the optical part 10, handling in an application where the semiconductor laser module 100 is used is facilitated.

The optical fiber 11 is able to be manufactured by processing both end portions of an optical fiber having a thick diameter with the main portion cladding diameter Aba that is approximately constant in the longitudinal direction into tapered shapes by mechanical polishing or chemical polishing, such as etching, for example.

Furthermore, as compared to the configuration in International Publication No. WO 2015/037725, layers of the adhesive member are able to be reduced by one layer in the configuration of the optical part 10.

Second Embodiment

Figure 6:
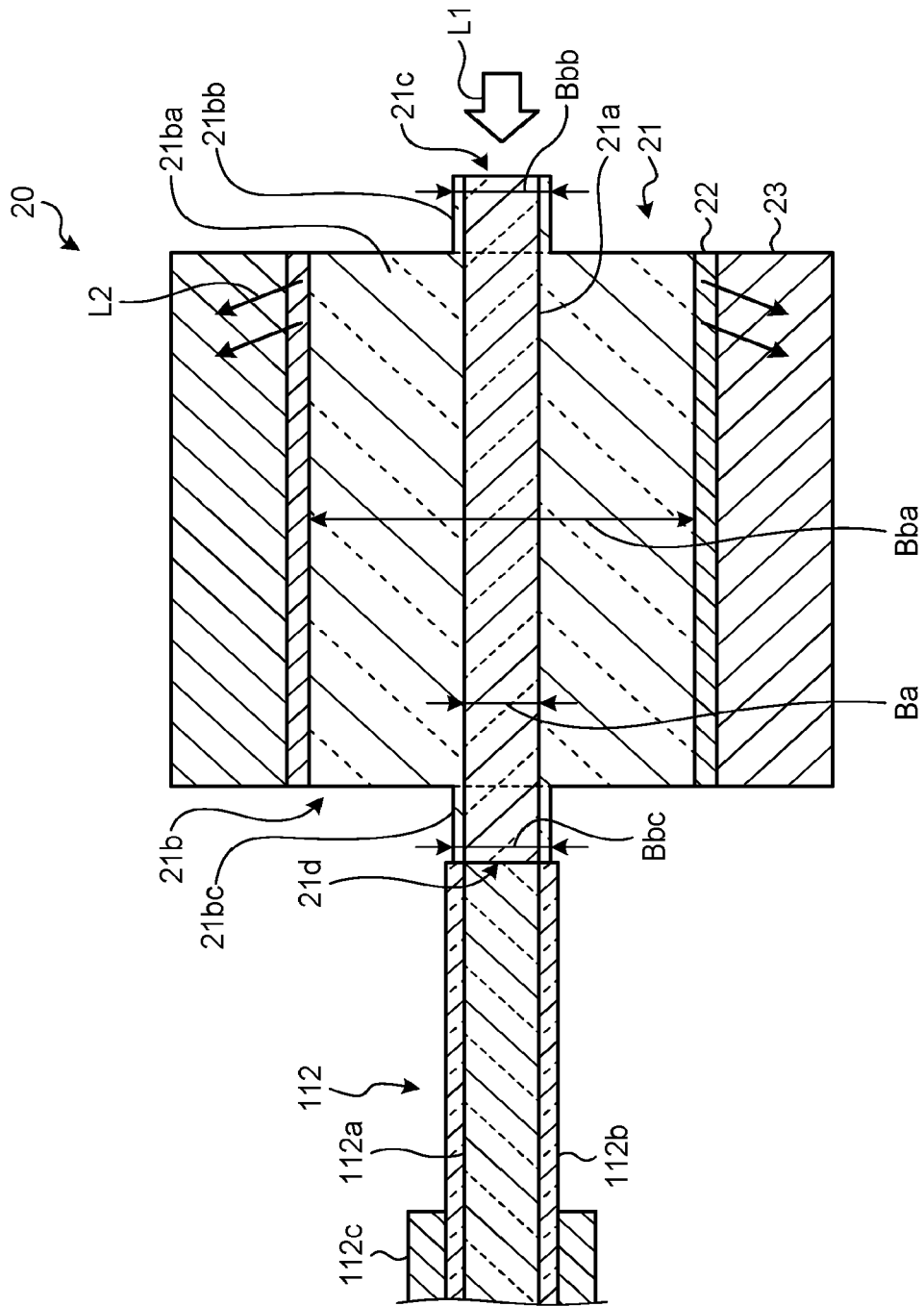
FIG. 6 is a schematic sectional view of an optical part according to a second embodiment and the optical fiber.

FIG. 6 is a schematic sectional view of an optical part 20 according to a second embodiment and the optical fiber 112. The optical part 20 may be used in place of the optical part 10 in the semiconductor laser module 100, for example.

The optical part 20 includes an optical fiber 21, an adhesive member 22, and a light absorber 23. The optical fiber 21 is an optical fiber made of a silica glass-based material, and has a core portion 21*a*, and a cladding portion 21*b* formed around the core portion 21*a*.

The core portion 21*a* has a core diameter Ba that is approximately constant in the longitudinal direction. The core diameter Ba is, for example, 100 µm.

The cladding portion 21*b* has: a main portion 21*ba* extending in the longitudinal direction; an input end portion 21*bb* positioned closer to an end of the cladding portion 21*b* than the main portion 21*ba* is, the end being where the laser light beam L1 is input; and an output end portion 21*bc* positioned closer to another end of the cladding portion 21*b* than the main portion 21*ba* is, the other end being where the laser light beam L1 is output. The cladding portion 21*b* has a refractive index lower than a refractive index of the core portion 21*a*.

The main portion 21*ba* has a main portion cladding diameter Bba that is approximately constant in the longitudinal direction. The input end portion 21*bb* has an input end face 21*c*. A cladding diameter at the input end face 21*c* will be referred to as an input end face cladding diameter Bbb. The input end face cladding diameter Bbb is smaller than the main portion cladding diameter Bba. Furthermore, in the longitudinal direction, the input end portion 21*bb* has a cladding diameter that is approximately equal to the input end face cladding diameter Bbb.

The output end portion 21*bc* has an output end face 21*d*. An output end face cladding diameter Bbc that is a cladding diameter at the output end face 21*d* is smaller than the main portion cladding diameter Bba. Furthermore, in the longitudinal direction, the output end portion 21*bc* is approximately equal to the output end face cladding diameter Bbc.

The light absorber 23 is provided around the optical fiber 21, and is adhered to the main portion 21*ba* of the cladding portion 21*b* by the adhesive member 22. Because suitable absorptivity and materials for the light absorber 23 are the same as those for the light absorber 13, description thereof will be omitted. Because suitable refractive indices and materials for the adhesive member 22 are the same as those for the adhesive member 12, description thereof will be omitted.

The optical fiber 112 is connected to the output end face 21d by fusion splicing, for example.

In this optical part 20, because the input end face cladding diameter Bbb is smaller than the main portion cladding diameter Bba, the power of the laser light beam propagated in a cladding mode without being coupled into the core portion 21a is able to be reduced, the laser light beam being a part of the laser light beam L1 input to the optical fiber 21.

Figure 7:
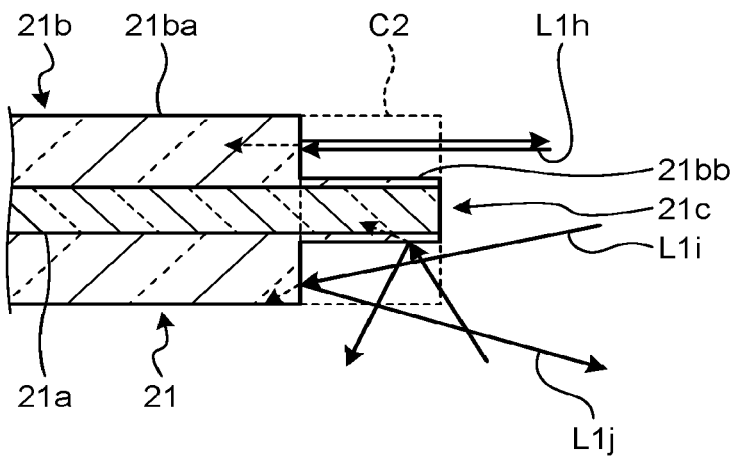
FIG. 7 is a diagram illustrating a state of input of laser light beams to an optical fiber.

FIG. 7 is a diagram illustrating a state of input of the laser light beams L1h, L1i, and L1j to the optical fiber 21. The laser light beams L1h, L1i, and L1j are a part of the laser light beam L1. Furthermore, a contour C2 represented by a broken line represents a case where the cladding diameter at the input end face 21c is the same as the cladding diameter at the main portion 21ba. In the case of the state with the contour C2, the laser light beams L1h, L1i, and L1j are all input to the cladding portion 21b and propagated in a cladding mode. However, because the cladding diameter at the input end face 21c of the optical fiber 21 is small, the laser light beams L1i, and L1j are hardly coupled into the cladding or are not coupled into the cladding at all, or the laser light beams L1i and L1j easily leak out even if the laser light beams L1i and L1j are coupled into the cladding. As a result, the power of the laser light beam propagated in a cladding mode is able to be reduced and the power of the laser light beam L2 (see FIG. 6) leaking from the cladding portion 21b is also able to be reduced. Damage to the adhesive member 22 is thereby able to be reduced. A high reflection (HR) film is preferably provided on a part of an end face of the main portion 21ba to reduce power of the laser light beam incident on the main portion 21ba significantly, the part being where the laser light beam is perpendicularly incident on the end face of the main portion 21ba like the laser light beam L1h.

Figure 8:
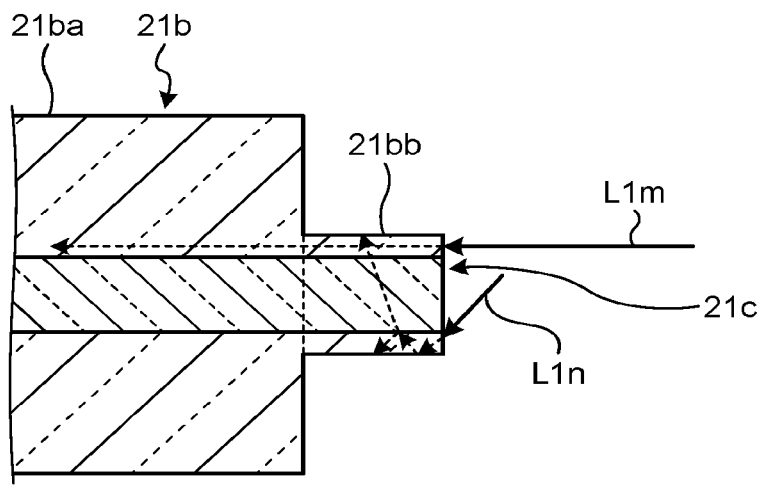
FIG. 8 is a diagram illustrating a state of input of laser light beams to the optical fiber.

FIG. 8 is a diagram illustrating a state of input of laser light beams L1m and L1n to the optical fiber 11. The laser light beams L1m and L1n are a part of the laser light beam L1. The laser light beams L1m and L1n enter the cladding portion 21b from the small end face of the input end portion 21bb and are propagated in a cladding mode but because the area is small, their power is limited, the small end face forming the input end face 21c.

Reference will now be made to FIG. 6 again. The input end face cladding diameter Bbb is preferably 1.4 times the core diameter Ba of the core portion 21a or smaller and preferably 1.1 times the core diameter Ba or larger, for the same reasons as those in the first embodiment illustrated in FIG. 2.

Furthermore, the main portion cladding diameter Bba of the main portion 21ba of the cladding portion 21b of the optical fiber 21 in this optical part 20 is larger than 125 µm, which is the cladding diameter of a standard optical fiber. In this embodiment, the main portion cladding diameter Bba is 500 µm, but the main portion cladding diameter Bba may be larger than 500 µm. As a result, the power density of the laser light beam L2 would be reduced by the time the laser light beam L2 propagated in the cladding mode reaches the outer peripheral surface of the main portion 21ba and passes through the adhesive member 22. Accordingly, damage to the adhesive member 22 is able to be reduced even more.

Similarly to the optical part 10, when the cladding diameter is increased, the cladding propagating light quantity enabling reduction of damage to the adhesive member 22 is able to be increased. In this case, the power of the laser light beam L1 input to the optical part 20 is also able to be increased and this increase is thus suitable for increasing the power of the semiconductor laser module 100.

Furthermore, because the output end face cladding diameter Bbc at the output end face 21d of the output end portion 21bc in this optical part 20 is smaller than 500 µm that is the main portion cladding diameter Bba, alignment and connection between the optical fiber 21 and the optical fiber 112 are facilitated.

The optical fiber 21 is able to be manufactured by processing both end portions of an optical fiber to decrease the diameters of the end portions by mechanical polishing or chemical polishing, such as etching, for example, the optical fiber having a thick diameter with the main portion cladding diameter Bba that is approximately constant in the longitudinal direction.

Third Embodiment

Figure 9:
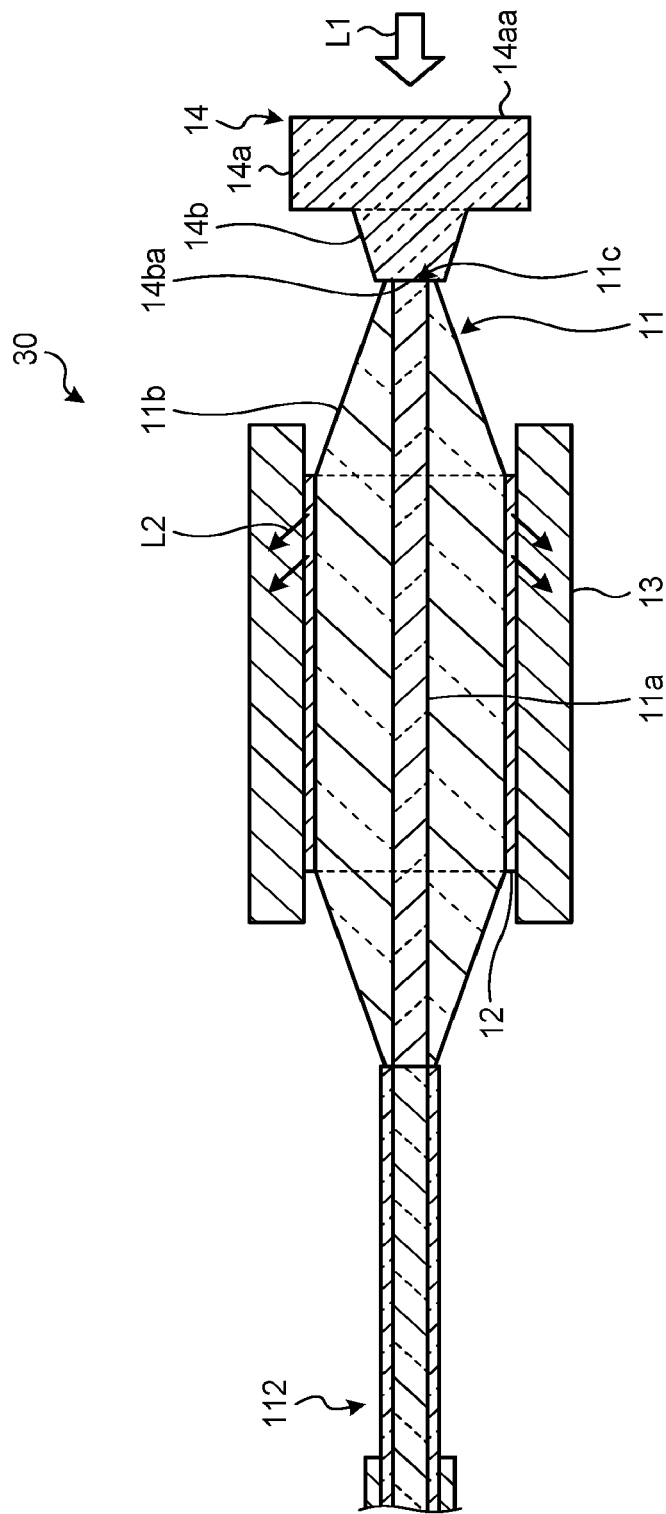
FIG. 9 is a schematic sectional view of an optical part according to a third embodiment and the optical fiber.

FIG. 9 is a schematic sectional view of an optical part 30 according to a third embodiment and the optical fiber 112. The optical part 30 may be used by substituting the optical part 30 for the optical part 10 in the semiconductor laser module 100, for example.

The optical part 30 has a configuration having an end cap 14 additionally to the configuration of the optical part 10. The end cap 14 has an input portion 14a that is cylindrically shaped and an output portion 14b that is truncated cone-shaped. An end face of the input portion 14a is an input end face 14aa and an end face of the output portion 14b is an output end face 14ba. The end cap 14 is connected to the input end face 11c of the optical fiber 11 at the output end face 14ba, by fusion splicing, for example. Because the output portion 14b has the truncated cone shape in which the output portion 14b decreases in diameter toward the output end face 14ba, the difference between diameters of the output end face 14ba and the input end face 11c of the optical fiber 11 is comparatively small. Therefore, alignment and connection between the optical fiber 11 and the end cap 14 are facilitated.

The input end face 14aa of the end cap 14 has an area larger than that of the input end face 11c of the optical fiber 11. As a result, when the laser light beam L1 that has been condensed is input to the optical part 30, by inputting the laser light beam L1 to the input end face 14aa of the end cap 14, the laser light beam L1 is input in a state where the beam power density of the laser light beam L1 is smaller than that in the case where the laser light beam L1 is directly input to the input end face 11c of the optical fiber 11. As a result, damage to the input end face by the power of the laser light beam L1 is able to be reduced. The end cap 14 is preferably made of a material having a refractive index that is about the same as that of the core portion 11a of the optical fiber 11, and this material is preferably, for example, a silica glass-based material that is the same as that for the core portion 11a of the optical fiber 11. The end cap 14 has a shape that is a combination of a cylindrical shape and a truncated cone shape, but is not limited to this shape.

Damage to the adhesive member 12 in the optical part 30 is reduced and damage to the input end face where the laser light beam L1 is input is also reduced.

Fourth Embodiment

Figure 10:
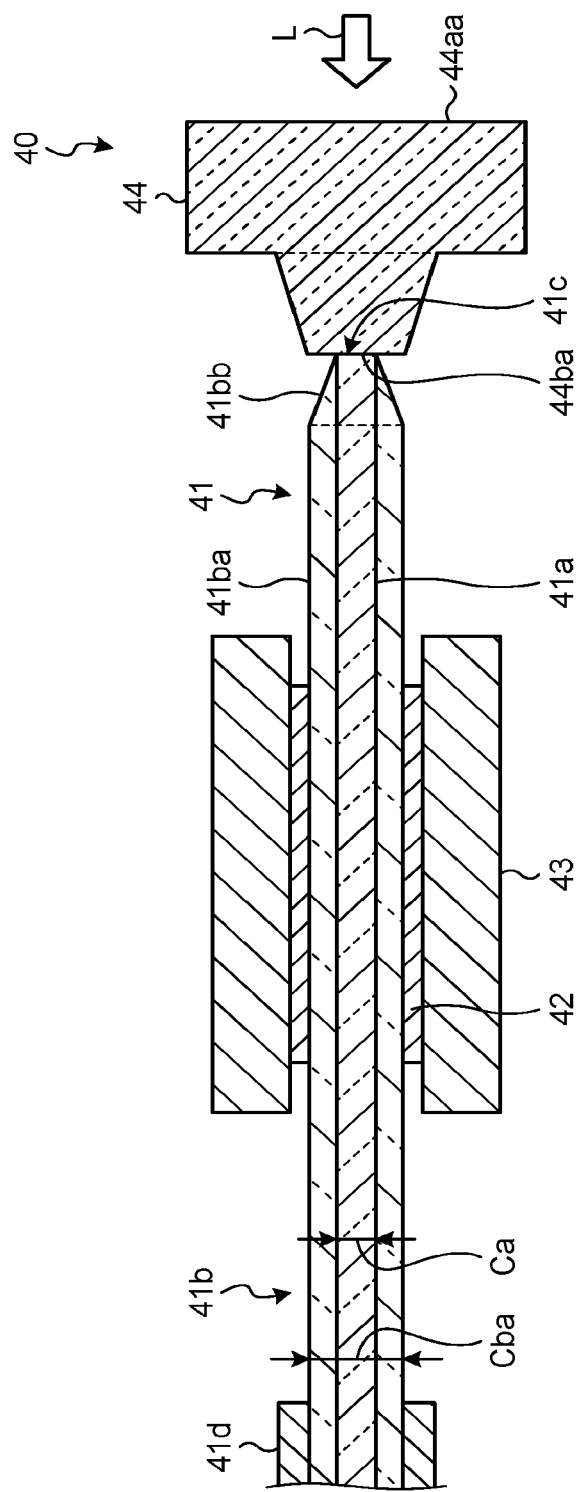
FIG. 10 is a schematic sectional view of an optical part according to a fourth embodiment.

FIG. 10 is a schematic sectional view of an optical part 40 according to a fourth embodiment. The optical part 40 may be used by substituting the optical part 40 for the optical part 10 and the optical fiber 112 in the semiconductor laser module 100, for example.

The optical part 40 includes an optical fiber 41, an adhesive member 42, a light absorber 43, and an end cap 44. The optical fiber 41 is an optical fiber made of a silica glass-based material, and has a core portion 41a, a cladding portion 41b formed around the core portion 41a, and a coating 41d formed around the cladding portion 41b.

The core portion 41a has a core diameter Ca that is approximately constant in the longitudinal direction. The core diameter Ca is, for example, 100 µm.

The cladding portion 41b has a main portion 41ba extending in the longitudinal direction, and an input end portion 41bb positioned closer to an end of the cladding portion 41b than the main portion 41ba is, the end being where the laser light beam L1 is input. The cladding portion 41b has a refractive index lower than a refractive index of the core portion 41a.

The main portion 41ba has a main portion cladding diameter Cba that is approximately constant in the longitudinal direction. The main portion cladding diameter Cba is, for example, 125 µm. The input end portion 41bb has an input end face 41c. An input end face cladding diameter that is a cladding diameter at the input end face 41c is smaller than the main portion cladding diameter Cba. Furthermore, the input end portion 41bb has a tapered shape in which its cladding diameter continuously changes from the main portion cladding diameter Cba to the input end face cladding diameter.

The light absorber 43 is provided around the optical fiber 41 and is adhered to the main portion 41ba of the cladding portion 41b by the adhesive member 42. Because suitable absorptivity and materials for the light absorber 43 are the same as those for the light absorber 13, description thereof will be omitted. Because suitable refractive indices and materials for the adhesive member 42 are the same as those for the adhesive member 12, description thereof will be omitted.

In this embodiment, a part of the coating 41d has been removed from the input end portion 41bb to at least the position where the light absorber 43 is provided, to expose the cladding portion 41b at the part. However, a portion of the coating 41d may be inside the light absorber 43 such that the portion of the coating 41d and the light absorber 43 overlap each other, the portion being at a distal end of the coating 41d. In this case, the coating 41d and the light absorber 43 may be integrally fixed by the adhesive member 42.

The end cap 44 is similar to the end cap 14 and is connected to the input end face 41c of the optical fiber 41 and the output end face 44ba by fusion splicing.

An input end face 44aa of the end cap 44 has an area larger than that of the input end face 41c of the optical fiber 41. As a result, damage to the input end face by the power of the laser light beam L1 is reduced.

In this optical part 40, because the input end face cladding diameter is smaller than the main portion cladding diameter Cba, the power of the laser light beam propagated in a cladding mode without being coupled into the core portion 41a is able to be reduced, the laser light beam being a part of the laser light beam L1 input to the optical fiber 41. Furthermore, because the optical fiber 41 has a core diameter and a cladding diameter that are similar to those of the optical fiber 112, the optical fiber 41 is able to be treated similarly to the optical fiber 112.

In the above described embodiments, the laser light beam has a wavelength in the infrared region, for example, but the wavelength is not limited to this example. For example, when the laser light beam has a short wavelength like green or blue laser light beam, the amount of energy absorbed by the adhesive member is larger than that for laser light beam having a wavelength in the infrared region, and effects of the present disclosure may thus become more prominent.

The present disclosure is not limited by the above described embodiments. Those configured by combination of the components described above as appropriate are also included in the present disclosure. Furthermore, further effects and modifications can be easily derived by those skilled in the art. Therefore, wider aspects of the present disclosure are not limited to the above described embodiments, and various modifications can be made.

The present disclosure may be used for optical parts and semiconductor laser modules.

According to an embodiment, it is possible to obtain an effect of reducing damage to optical parts and semiconductor laser modules.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. An optical part, comprising:
   an optical fiber having a core portion and a cladding portion that is formed around the core portion;
   a light absorber placed around the optical fiber; and
   an adhesive member that adheres the light absorber and the optical fiber to each other, wherein the cladding portion includes:
      a main portion extending along a longitudinal direction and having a main portion cladding diameter; and
      an input end portion positioned closer to a light input side with respect to the main portion,
   wherein:
      an input end face cladding diameter at an input end face of the input end portion is less than the main portion cladding diameter and is larger than a core diameter of the core portion,
      the core portion has a core diameter that is approximately constant in the longitudinal direction,
      the input end portion is tapered such that the input end portion changes in cladding diameter from the main portion cladding diameter to a diameter substantially equal to the input end face cladding diameter, and
      the input end face cladding diameter is 1.1 times the core diameter of the core portion or larger, and 1.4 times the core diameter or smaller such that a laser light beam propagated through the core portion does not reach an outer periphery of the cladding portion by seeping out to the cladding portion, and laser light beams incident on a tapered surface of the input end portion are reflected by the tapered surface of the input end portion or leak out of the cladding portion if the laser light beams are coupled into the cladding portion, wherein part of the input end portion of the cladding portion is coplanar with the input end face of the core portion.

2. The optical part according to claim 1, wherein
   the cladding portion includes an output end portion positioned closer to a light output side of the cladding portion with respect to the main portion, and an output end face cladding diameter at an output end face of the output end portion is smaller than the main portion cladding diameter.

3. The optical part according to claim 1, comprising an end cap connected to the input end face of the optical fiber, the end cap having an input end face having an area larger than an area of the input end face of the optical fiber.

4. The optical part according to claim 1, wherein the main portion cladding diameter is larger than 125 µm.

5. The optical part according to claim 1, wherein the main portion cladding diameter is 500 µm or larger.

6. A semiconductor laser module, comprising:
the optical part according to claim 1;
a semiconductor laser element; and
an optical system that guides a laser light beam output from the semiconductor laser element to the input end face of the optical part.

7. The optical part according to claim 6, wherein the cladding portion consists of continuous cladding material.

8. The optical part according to claim 6, wherein the cladding portion consists of cladding material having a substantially homogeneous refractive index.

9. The optical part according to claim 1, wherein the cladding portion consists of continuous cladding material.

10. The optical part according to claim 1, wherein the cladding portion consists of cladding material having a substantially homogeneous refractive index.

11. An optical part, comprising:
an optical fiber having a core portion and a cladding portion that is formed around the core portion;
a light absorber placed around the optical fiber; and
an adhesive member that adheres the light absorber and the optical fiber to each other, wherein the cladding portion includes:
  a main portion extending along a longitudinal direction and having a main portion cladding diameter; and
  an input end portion positioned closer to a light input side with respect to the main portion,
wherein:
  an input end face cladding diameter at an input end face of the input end portion is less than the main portion cladding diameter and is larger than a core diameter of the core portion,
  the core portion has a core diameter that is approximately constant in the longitudinal direction,
  the input end portion is tapered such that the input end portion changes in cladding diameter from the main portion cladding diameter to a diameter substantially equal to the input end face cladding diameter, and
  the input end face cladding diameter is 1.1 times the core diameter of the core portion or larger, and 1.4 times the core diameter or smaller such that a laser light beam propagated through the core portion does not reach an outer periphery of the cladding portion by seeping out to the cladding portion, and laser light beams incident on a tapered surface of the input end portion are reflected by the tapered surface of the input end portion or leak out of the cladding portion if the laser light beams are coupled into the cladding portion, wherein the input end portion of the cladding portion terminates in a plane of the input end face of the core portion.

12. The optical part according to claim 11, wherein
the cladding portion includes an output end portion positioned closer to a light output side of the cladding portion with respect to the main portion, and
an output end face cladding diameter at an output end face of the output end portion is smaller than the main portion cladding diameter.

13. The optical part according to claim 11, comprising an end cap connected to the input end face of the optical fiber, the end cap having an input end face having an area larger than an area of the input end face of the optical fiber.

14. The optical part according to claim 11, wherein the main portion cladding diameter is larger than 125 µm.

15. The optical part according to claim 11, wherein the main portion cladding diameter is 500 µm or larger.

* * * * *